United States Patent [19]

McMickle

[11] 3,986,679

[45] Oct. 19, 1976

[54] FLY REEL

[75] Inventor: Robert L. McMickle, Rolling Hills, Calif.

[73] Assignee: Berkley & Company, Inc., Spirit Lake, Iowa

[22] Filed: Aug. 1, 1974

[21] Appl. No.: 493,983

[52] U.S. Cl. ................ 242/84.53; 188/77 R
[51] Int. Cl.² ............................... A01K 89/02
[58] Field of Search ..... 242/84.53, 84.5 R, 84.51 R, 242/84.51 A, 84.21 R, 99; 188/77 R

[56] References Cited
UNITED STATES PATENTS

| 557,832 | 4/1896 | Knight | 242/99 |
|---|---|---|---|
| 1,513,893 | 11/1924 | Coleman | 242/84.5 R |
| 2,402,882 | 6/1946 | Garr | 242/84.51 R UX |
| 2,705,113 | 3/1955 | Bonanno | 242/84.21 R |
| 2,712,908 | 7/1955 | Kozminski | 242/99 |
| 3,198,175 | 8/1965 | Dean | 242/99 X |
| 3,268,182 | 8/1966 | Clark | 242/84.53 |

Primary Examiner—Billy S. Taylor
Attorney, Agent, or Firm—Orrin M. Haugen

[57] ABSTRACT

A fishing reel, particularly a fly fishing reel, which is provided with an auxiliary drag assembly actuated by finger pressure exerted radially inwardly on the assembly. The reel includes a line receiving spool with the spool flanges having an outer peripheral edge defining a braking surface. The frame means includes a circular spool retaining ring comprising first and second concentrically disposed arcuate sectors, with the arcuate sectors having a substantial degree of arcuate overlap wherein one of the sectors is provided with an arcuate cantilevered segment which may be forced inwardly by finger pressure to make contact with the outer edge surface of the spool flange so as to generate frictional drag resisting free rotation of the line spool within the frame.

7 Claims, 7 Drawing Figures

FLY REEL

BACKGROUND OF THE INVENTION

The present invention relates generally to an improved fly reel, and more specifically to a fly reel provided with an auxiliary drag or brake means arranged to be actuated by finger pressure applied by the fisherman to the drag assembly. The actuating means for the auxiliary drag is disposed at a point which is accessible to the fisherman without requiring the fisherman to move his hands from a normal reel gripping position. In other words, it is not necessary for the fisherman to re-arrange or re-position the rod and reel in order to actuate the auxiliary drag assembly.

Normally, fly fishing reels are equipped with a drag of the ratchet type. Such a conventional drag assembly is normally not useful for application of a braking force to the reel when a game fish is hooked and starts to run. In order to achieve such a braking force, the fisherman will normally apply finger pressure to the surface of the line remaining within the confines of the line receiving spool. In the event the fisherman has hooked a large fish which has commenced a run, such finger pressure to achieve braking may be ineffective.

In the past, a variety of auxiliary drag assemblies have been proposed which can be utilized to exert a braking force on the line spool, and thus assist in controlling the play of the fish. These auxiliary drag assemblies frequently require the fisherman to hold the rod and reel assembly in an unusual or unnatural fashion, or may require the preparation of a complex system which is heavy and relatively difficult to assemble and service. Additionally, certain fly fishing reels have been equipped with auxiliary drag assemblies which tend to grip the spool tightly, and thus exert unusual or heavy forces on the line, thereby risking breaking of the line. The auxiliary drag mechanism of the present invention permits a wide variety of forces to be applied to the line spool, with the braking force being directly proportional to the finger pressure exerted by the fisherman upon the auxiliary drag assembly, with minimum weight increase.

SUMMARY OF THE INVENTION

Briefly, in accordance with the present invention, the fly fishing reel includes a frame means with a line receiving spool means mounted therewithin. The frame means includes a pair of laterally disposed line spool confining rings or members, each spool confining member comprising first and second generally concentrically disposed arcuate sectors or segments which are overlapped arcuately for a significant arcuate distance. One of the overlapping segments becomes a cantilevered beam portion which is resilient in a radial direction, with the inner circumferential portion thereof being arranged to engage the outer peripheral edge surface of the spool. A force applied radially inwardly against the cantilevered portion will urge the cantilevered portion against the peripheral edge of the line spool so as to generate frictional drag resisting free rotation of the line spool within the frame. The magnitude of braking force applied to the assembly is in direct proportion to the finger pressure applied to the assembly by the fisherman, and thus is totally predictable and reliable.

Therefore, it is a primary object of the present invention to provide an improved fly fishing reel which includes an auxiliary drag mechanism which is functional as a braking mechanism for the fisherman.

It is a further object of the present invention to provide an improved fishing reel equipped with an auxiliary drag mechanism functional as a braking mechanism, and which is actuated by the fisherman without requiring the fisherman to alter, change, or otherwise modify a normal grip of the rod and fly reel assembly.

It is yet a further object of the present invention to provide an improved fly reel which is equipped with an auxiliary drag mechanism, and wherein the drag mechanism includes an arcuate cantilevered arm which is resilient and capable of flexure in a radial direction, and wherein the inner circumferential surface of the arcuate cantilevered portion may be forced against the outer peripheral edge surface of the line spool flange so as to generate frictional drag against free rotation of the line receiving spool within the frame.

Other and further objects of the present invention will become apparent to those skilled in the art upon a study of the following specification, appended claims, and accompanying drawings.

DESCRIPTION OF THE PREFERRED EMBODIMENT

Figure 1:
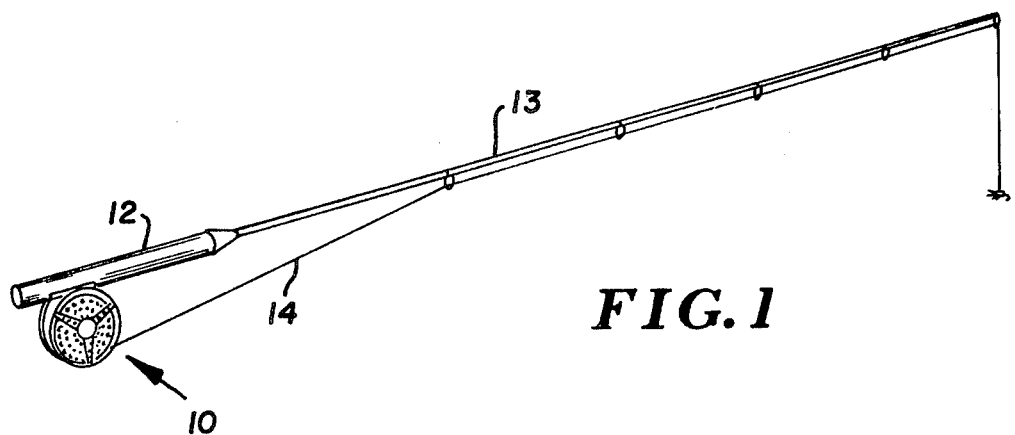
FIG. 1 is a perspective view of the improved fishing reel shown mounted on a conventional fly rod.

In accordance with the preferred embodiment of the present invention, and with attention being directed to FIG. 1, the improved fly fishing reel generally designated 10 is shown in a conventional operational mode, being attached to the butt or handle portion 12 of rod 13. Also, as is conventional, line 14 is shown extending from the reel 10 and outwardly through the guides of rod 13.

Figure 2:
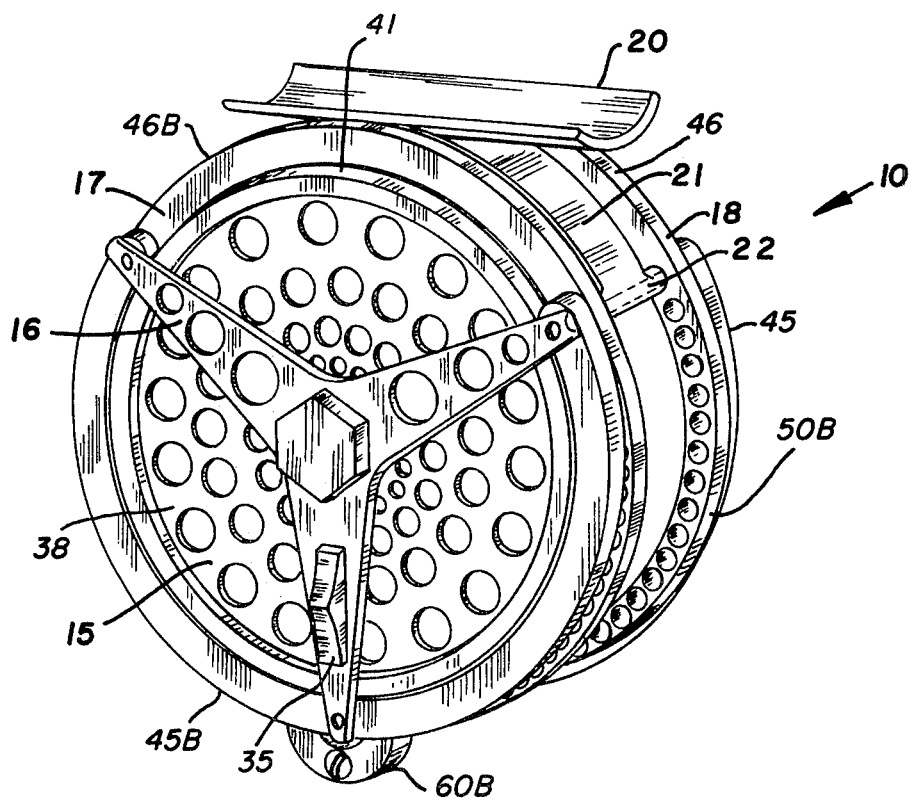
FIG. 2 is a perspective view of the fishing reel.
Figure 3:
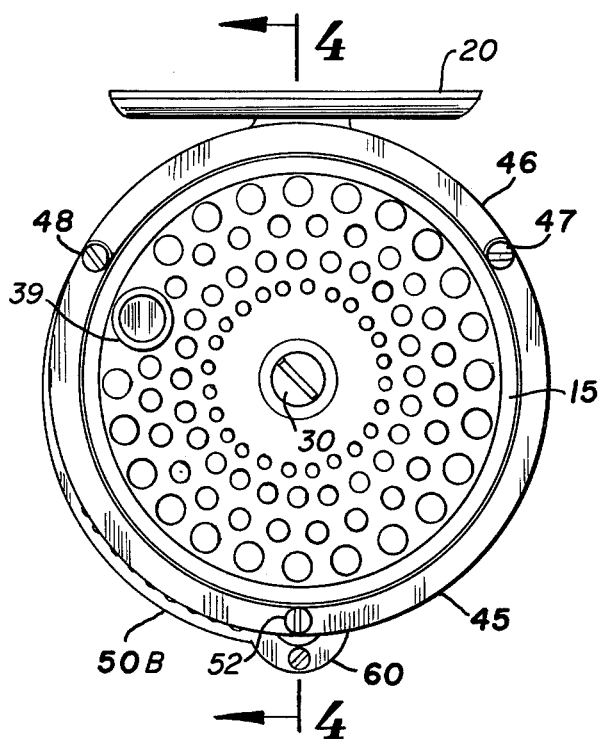
FIG. 3 is a side elevational view of the fishing reel illustrated in FIG. 2.

With attention now being directed to FIG. 2, it will be seen that the reel 10 includes frame means which are arranged to retain or hold line receiving spool means 15 therewithin. The frame means includes a spider member 16 which supports, at its outer extremities, a spool confining member or ring 17. A similar spool confining member or ring is shown in laterally opposed relationship to member 17, as at 18. Each of the spool confining members 17 and 18 comprise a pair of arcuate sectors or segments, such as the arcuate sectors 45 and 46, as illustrated in FIG. 3, as more fully explained hereinafter. Also, as is conventional in fishing reels of this type, a mounting member 20 is provided in order to permit attachment to the fishing rod, in the manner illustrated in FIG. 1. Further, an arcuate cradle element is illustrated at 21 in order to provide a means of attachment of member 20 to the line spool confining members 17 and 18. As indicated, cradle 21 has mounting sleeves arranged at opposed ends thereof, such as is illustrated at 22 and 23, with these mounting sleeves being shown in greater detail in FIGS. 5 and 6.

Figure 4:
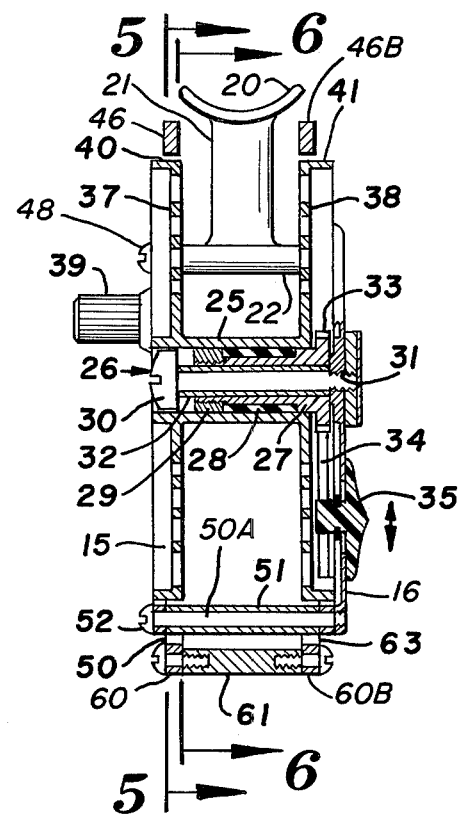
FIG. 4 is a sectional view taken along the line and in the direction of the arrows 4—4 of FIG. 3.

Attention is now directed to FIGS. 3 and 4 of the drawings wherein further details of the fishing reel are illustrated. As is apparent in FIG. 4, the core 25 of line spool 15 is mounted over a main shaft assembly generally designated 26, which assembly includes a gear hub 27 along with rubber sleeve member 28, members 27 and 28 being adjustably compressably retained together by gear hub nut 29. Screw 30 is provided coaxially internally of members 27, 28 and 29, with the threaded end of screw 30 being engaged in retainer 31. Hub bushing 32 is provided over the periphery of screw 30 to permit axial rotation of spool 15 within the reel structure. The arrangement is such that upon compressing tubular sleeve 28 between members 27 and 29, the outer periphery of tubular sleeve 28 expands outwardly and thus engages firmly the core 25 of line receiving spool 15. Compression of tubular sleeve 28 between members 27 and 29 is accomplished with spool 15 being removed. Gear hub 27 is provided with a geared surface 33 which is arranged to engage clicker pick 34, with button 35 controlling the radial disposition of the working end of pick 34 so as to provide for varying degrees of engagement or disengagement of pick 34 with the teeth of gear 33. The engagement of pick 34 with the teeth of gear 33 provides a drag on the rotation of line receiving spool 15 within the frame means, with clicker pick drag arrangements being conventional in fishing reels.

Line spool 15, in addition to core 25, is provided with flanges 37 and 38, with winding crank 39 being provided to enable the fisherman to wind the spool during use. Each of the flanges 37 and 38 is provided with an outer peripheral edge having a surface extending axially of the spool, as is shown at 40 and 41. This axially extending surface provides a braking surface when in engagement with the auxiliary drag or braking assembly which will be described in greater detail hereinafter.

The laterally disposed line spool confining members 17 and 18 each include first and second generally concentrically disposed arcuate sectors or segments, such as the arcuate sectors 45 and 46, as illustrated in FIG. 3. Each of these sectors encompasses approximately 240° of arc, and are joined together, one to another, by screws 47 and 48, which extend through mounting sleeves 22 and 23, as previously described. These sectors are overlapping for approximately 120° of arc with the individual segments being shown at their overlapping zones in FIG. 2. A further spacer and clamping arrangement for the individual arcuate sectors or segments is shown at 50 in FIG. 4, with this arrangement including a spacer sleeve 51 and a screw 52, screw 52 spanning the width of the reel between the laterally disposed spool confining members 17 and 18. The overlapping or stacking arrangement of the individual arcuate sectors forming members 17 and 18, together with the spacing feature of the cradle 21 is believed best illustrated in FIG. 2 of the drawings.

With continuing attention being directed to FIGS. 3 and 4, it will be observed that the first arcuate sector 45 has spaced coupling means 47 and 48 arranged at its opposed ends. With sector 46 being secured to sector 45 at these two points, a captive span or zone is provided between mounting points 47 and 48, and an arcuate cantilevered portion is provided in that arcuate part or segment which is illustrated as at 50. Arcuate sector 46 is fabricated from resilient or flexible metal so as to render the cantilevered portion resiliently deflectable in a radial direction. In order to achieve both durability and flexibility in the same metallic member, arcuate cantilevered portion 50 is provided with a means for increasing the flexibility of the cantilevered portion. An increase in flexibility may be obtained by a reduction in cross-sectional, or by other means such as, for example, providing a plurality of bores so as to render the portion more resilient or flexible. Thus, the increase in resiliency may be achieved without significantly weakening the cantilevered portion, while continuing to provide a durable product.

Figure 5:
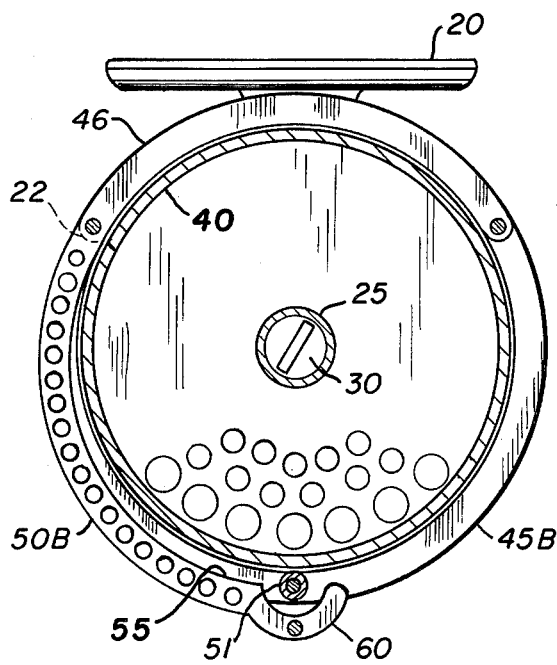
FIG. 5 is a sectional view taken along the line and in the direction of the arrows 5—5 of FIG. 4, and illustrating the normal disposition of the auxiliary drag assembly.
Figure 6:
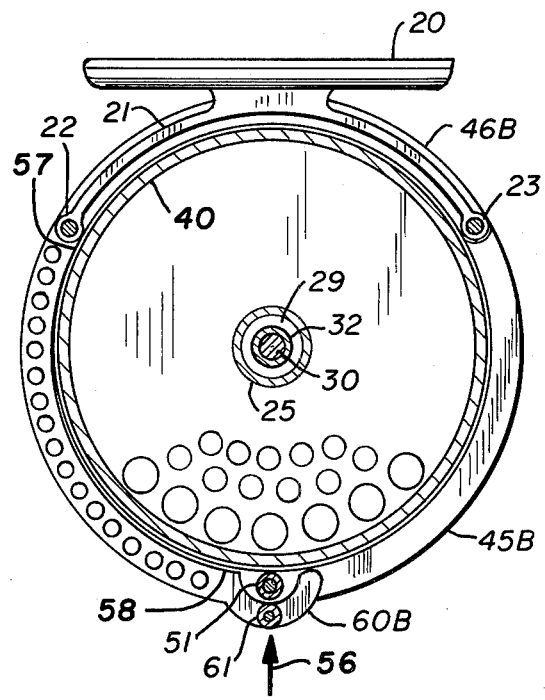
FIG. 6 is a sectional view similar to FIG. 5, taken along the line and in the direction of the arrows 6—6 of FIG. 4, and showing the auxiliary drag assembly in braking disposition.
Figure 7:
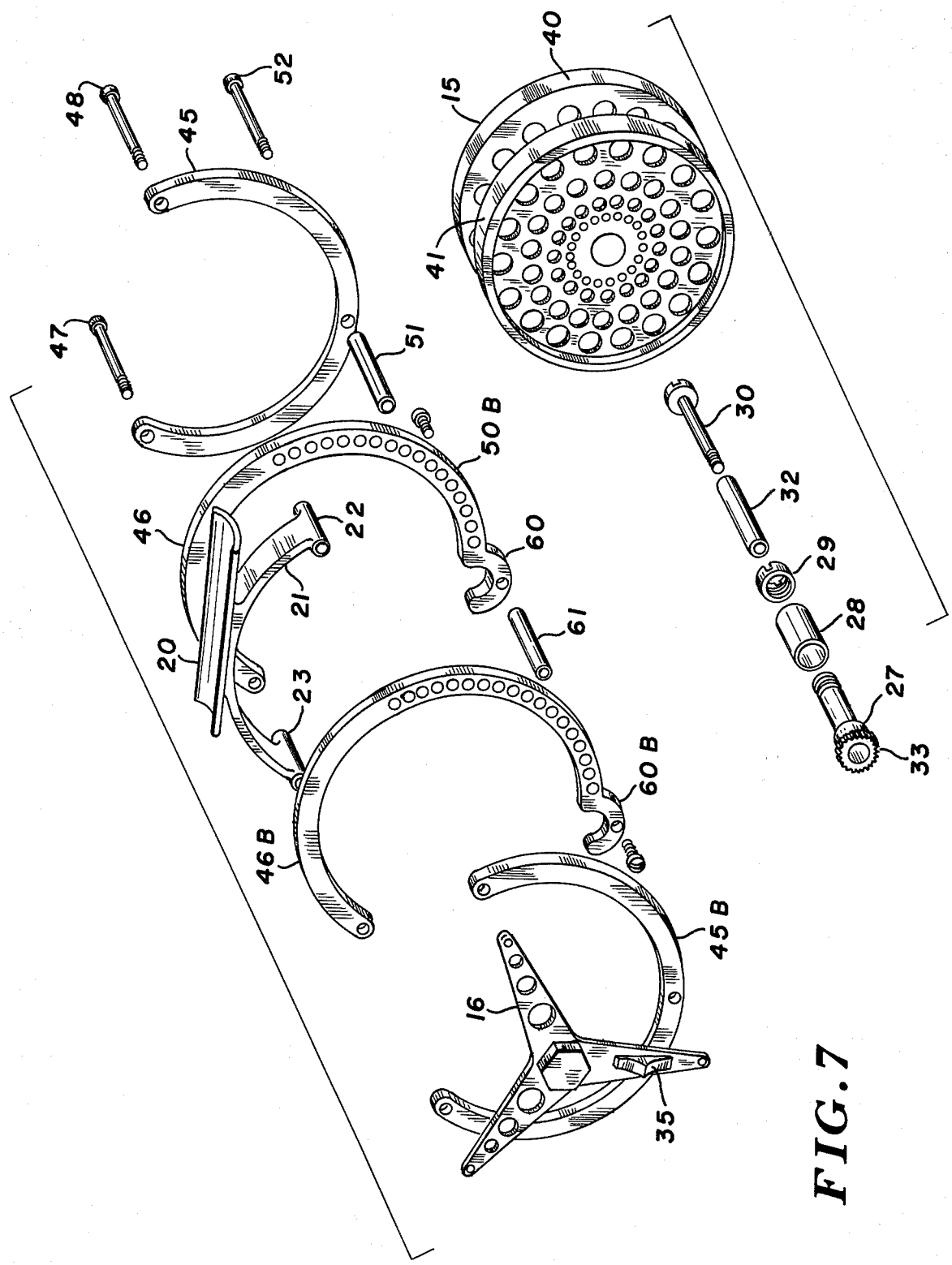
FIG. 7 is an exploded perspective view, similar to FIG. 2, and illustrating the manner in which the support structure for the spool is arranged.

Attention is now directed to FIGS. 5 and 6 wherein the details of the auxiliary drag or braking assembly are illustrated in greater detail. Specifically, it will be seen that the inner circumferential surface 55 of cantilevered member 50 is axially aligned with the spool flange outer edge surface 40, and as illustrated in FIG. 5, surface 55 is normally spaced radially outwardly from surface 40, with a gap being shown in FIG. 5. However, when the force is applied to cantilevered member 50 in the direction of arrow 56 in FIG. 6, cantilevered portion 50 deflects radially inwardly so as to provide contact along an extensive portion of spool surface 40, such as the arcuate segment extending between points 56 and 57 of the cantilevered portion 50, as illustrated in FIG. 6. In other words, as cantilevered portion 50 is deflected radially inwardly, a greater amount of surface contact is provided between the surfaces 55 of the auxiliary drag or braking assembly and the surface 40 of the line spool. The frictional drag increases controllably, therefore, as a function of the force applied to the assembly, with this friction resisting free rotation of the line receiving spool within the frame means. With attention being directed to FIG. 7 of the drawings, it will be observed that those components taken from the side opposite that shown in FIGS. 3, 5 and 6 carry the suffix "B" to identify the corresponding and mating component.

In order to permit the fisherman to readily engage the auxiliary drag or braking assembly, a radially outwardly extending projection is provided as at 60. A transverse spacer element is available as at 61 to transfer or otherwise apply radially inwardly directed forces to both sides of the reel when two such braking assemblies are provided. Thus, when the fisherman desires to apply a drag force to the reel, he will merely press the projection 56 radially inwardly, and thus achieve effective braking action.

It will be appreciated, therefore, that the fisherman in utilizing the fishing reel of the present invention will be able to effectively brake the outward running of the line without requiring a change in the normal handling of the rod and reel during fishing. This, of course, is a valuable feature for the fisherman, inasmuch as a greater degree of control can be exercised by the fisherman when such control is indicated.

In the structure described in the drawings, it will be noted that each side of the reel 10 is provided with substantially identical laterally disposed line spool confining members such as the members 17 and 18. Each of these includes first and second generally concentrically disposed arcuate sectors or segments such as the sectors 45 and 46, with each having a cantilevered end portion as shown at 50 and 63. In certain instances, it may be found that a single such braking member may be sufficient, however, for most purposes, a pair of such members is provided.

I claim:

1. In a fishing reel comprising fram means and a line receiving spool means mounted therewithin, frame line receiving spool means including a central core with flanges secured to opposed ends thereof and being mounted for axial rotation within said frame means;
   a. said spool flanges having an outer periphery with an edge surface extending axially of said spool;
   b. said frame means including a pair of laterally disposed line spool confining members, each confining member comprising first and second generally concentrically disposed arcuate sectors with said first arcuate sector having spaced coupling means at opposed ends thereof securing said second arcuate sector thereto, with said spaced coupling means providing said second arcuate sector with an arcuate captive portion interposed between said spaced coupling means and an arcuate cantilevered arm portion extending therefrom and having a free end;
   c. said cantilevered portion being resilient in a radial direction and with the inner circumferential portion thereof having an inner axially extending edge surface axially aligned with said spool flange outer edge surface and normally spaced radially outwardly from said spool flange outer edge;
   d. means for transmitting a force applied radially inwardly adjacent the free end of said cantilevered portion to generate frictional drag against said axially extending outer edge surfaces of said spool flange for resisting free rotation of said line receiving spool within said frame means.

2. The fishing reel as defined in claim 1 being particularly characterized in that said first and second arcuate sectors are disposed outwardly adjacent each of said spool flanges.

3. The fishing reel as defined in claim 1 being particularly characterized in that each arcuate sectors subtends substantially 240° of arc.

4. The fishing reel as defined in claim 1 being particularly characterized in that said frame means includes a centrally disposed mounting shaft for said line spool means, and wherein said mounting shaft is expandable radially outwardly to engage the central core of said line spool means.

5. The fishing reel as defined in claim 2 being particularly characterized in that transverse coupling means are provided between the three ends of said arcuate cantilevered arm portions.

6. The fishing reel as defined in claim 3 being particularly characterized in that said second arcuate sector is coupled to said first arcuate sector with said arcuate captive portion extending from a point immediately adjacent the end of said second arcuate sector.

7. The fishing reel as defined in claim 1 being particularly characterized in that the inner and outer diameters of said first and second arcuate sectors are substantially equal.

* * * * *

UNITED STATES PATENT OFFICE
CERTIFICATE OF CORRECTION

PATENT NO. : 3,986,679
DATED : October 19, 1976
INVENTOR(S) : Robert L. McMickle It is certified that error appears in the above—identified patent and that said Letters Patent are hereby corrected as shown below:

Column 5, line 7, "fram" should read -- frame --.
Line 8, delete the word "frame", and put instead -- said --.

Signed and Sealed this

Fourteenth Day of December 1976

[SEAL]

Attest:

RUTH C. MASON
*Attesting Officer*

C. MARSHALL DANN
*Commissioner of Patents and Trademarks*